United States Patent
Goodzeit et al.

(12) 
(10) Patent No.: US 6,845,950 B1
(45) Date of Patent: Jan. 25, 2005

(54) SYSTEM FOR HIGH EFFICIENCY SPACECRAFT ORBIT TRANSFER

(75) Inventors: Neil Evan Goodzeit, Princeton, NJ (US); Santosh Ratan, Highland Park, NJ (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 10/723,915

(22) Filed: Nov. 26, 2003

(51) Int. Cl.[7] ............................................... B64G 1/00
(52) U.S. Cl. ..................... 244/158 R; 244/176; 701/13; 701/226
(58) Field of Search ........................... 244/158 R, 176; 701/13, 226

(56) References Cited

U.S. PATENT DOCUMENTS

| | | | |
|---|---|---|---|
| 5,862,495 A | * | 1/1999 | Small et al. .................. 701/13 |
| 6,102,334 A | * | 8/2000 | Claffey et al. .......... 244/158 R |
| 6,315,248 B1 | * | 11/2001 | Rockwell ..................... 244/172 |
| 6,508,438 B2 | * | 1/2003 | Eyerly ........................ 244/164 |

OTHER PUBLICATIONS

TRW Space Data, pp 36–37.*

* cited by examiner

*Primary Examiner*—J. Woodrow Eldred
(74) *Attorney, Agent, or Firm*—McDermott Will & Emery LLP

(57) ABSTRACT

The present invention relates generally to systems and methods for transferring a spacecraft from a first orbit to a second orbit. In accordance with one embodiment of the invention, the method comprises calculating thruster-off regions within an orbit transfer in which it is efficient to turn-off spacecraft thrusters, and in those thruster-off regions, turning off the spacecraft thrusters.

31 Claims, 3 Drawing Sheets

SYSTEM FOR HIGH EFFICIENCY SPACECRAFT ORBIT TRANSFER

BACKGROUND OF THE INVENTION

The present invention relates to orbit transfer techniques, and more particularly to systems and methods for efficiently transferring a spacecraft from one orbit to another orbit.

Typically, a spacecraft is launched into an initial orbit that differs from the final orbit that the spacecraft is to follow during its lifetime. A spacecraft launch vehicle places the spacecraft in its initial or launch vehicle insertion orbit. The launch vehicle, however, generally does not have sufficient capability to place the spacecraft into its mission orbit. As a result, the spacecraft must be transferred from its initial insertion orbit to its final mission orbit, typically by using a spacecraft on-board propulsion system.

For a geosynchronous orbit (GEO) spacecraft, a velocity change (Delta-V) of approximately 1600 m/sec is needed to transfer the spacecraft from a typical injection orbit to a final GEO orbit. As one skilled in the art will appreciate, the time allocated to transfer the spacecraft to the final mission orbit is limited, so the spacecraft typically requires a high-thrust propulsion system to generate the needed velocity change for a large spacecraft dry mass (e.g., 2000 to 3500 kg).

The high-thrust propulsion system can comprise a liquid apogee engine (LAE) that burns a mixture of hydrazine and oxidizer to generate a thrust of about 100 to 150 lbf with a mass specific impulse (ISP) of about 325 seconds (the ISP is the ratio of the thrust to the mass flow rate, a higher value indicating that less fuel is needed to achieve the same applied impulse). The orbit transfer then can be performed by performing a sequence of four to six LAE maneuvers at or near the orbit apogee, with each maneuver lasting less than 1 hour. Using this approach, the transfer to the GEO mission orbit can be accomplished in less than 2 weeks. However, the performance of this approach, as measured by the mass delivered to orbit on a given launch vehicle, is limited by the capability of the launch vehicle and the amount of chemical propellant that can be stored on-board the spacecraft.

The LAE orbit transfer approach provides reasonable efficiency and a rapid orbit transfer, but for heavy spacecraft the combined launch vehicle and on-board LAE system can be insufficient to transfer the spacecraft to the mission GEO orbit. To address this problem, a hybrid orbit transfer approach recently has been introduced that performs the orbit transfer in two phases. The first phase includes some number of LAE firings to transfer the spacecraft from the initial injection orbit to an intermediate orbit, which typically has its perigee above the Van Allen radiation belts to limit solar array degradation during the final orbit transfer phase (phase 2).

During phase 2, high-efficiency low-thrust thrusters, such as ion thrusters, are fired for a period of several weeks to several months to complete the transfer to the mission GEO orbit. The thrusters can be gridded ion thrusters or Hall Current Thrusters (HCTs), which generate thrust by ionizing xenon atoms and accelerating them through a potential gradient. The ion thrusters have low thrust (e.g., less than 0.1 lbf), but have high specific impulse of from about 2000 to about 3500 seconds. Because this phase uses low thrust thrusters, the thrusters must be fired for extended time periods to provide a significant benefit.

The time available to perform the final orbit transfer phase (phase 2) depends on the orbit time that is acceptable to the customer. Because the customer almost always wants revenue generating service to begin as soon as possible after the spacecraft launch, the allocated time usually is not more than 90 days. The longer the allocated time, the longer the ion thrusters can fire, and therefore, the larger the achievable payload mass that can be delivered to the mission orbit.

According to prior-art implementations of the above described orbit transfer approach, the ion thrusters are fired continuously while the spacecraft attitude is controlled so that the thrust vector follows a pre-specified inertial trajectory, referred to as a thrust vector trajectory. This approach is referred to as a continuous firing strategy. The thrust vector trajectory can be determined by numerical optimization techniques well known to those skilled in the art. For example, the continuous firing thrust vector trajectory can be calculated to provide a transfer from an initial orbit to a final orbit in the minimum possible time. The resulting minimum-time transfer-orbit trajectory consists of a specific time history of the orbit elements as they vary from an initial orbit to a final orbit while the thrusters are firing continuously. With this strategy, continuous thruster firing typically is maintained, except in locations where it is not possible, for example, due to the lack of adequate electrical power during eclipse periods, or due to unanticipated failures and contingencies.

The drawback of the continuous firing strategy is that, for at least some portions of the orbit, the thruster firing is inefficient. For example, inefficiencies may occur when the intermediate orbit (final phase start orbit) has an apogee altitude equal to the GEO altitude (synchronous altitude) and has zero inclination. In this case, there is no useful benefit for the thrust provided in the region around orbit perigee, since thrusting at perigee is most useful for changing the apogee altitude or inclination, and neither of these corrections are required in this case.

To provide a higher efficiency orbit transfer, alternative strategies are possible where the thrusters are fired for only a portion of each orbit, in regions where firing is most efficient. This approach is referred to as an on/off firing strategy. For example, it is well known that, in the above example of an orbit with a synchronous altitude apogee, the thrusters may be fired efficiently for some region about apogee to correct inclination and raise the perigee altitude. One drawback of this approach, however, is that although the efficiency of firing can be increased, the firing can be sufficiently intermittent so that it is not possible to deliver the spacecraft mass to GEO orbit within the allocated time.

Furthermore, current on/off firing strategies tend to be "ad hoc". That is, the off and on firing regions are selected based on experience with impulsive maneuvers, such as LAE maneuvers, and preferred orbital regions for executing such maneuvers. Additionally, the functional form of the expression used to model the thrust vector trajectory also may be determined based on experience. The trajectory itself may then be determined using a numerical optimization procedure in which the trajectory model parameters are varied to achieve the best results. The use of an assumed thrust vector trajectory and ad hoc selected orbital firing regions imposes artificial constraints that limit the performance of these methods compared to methods where the optimal trajectory and on/off firing regions are solved for directly.

Thus, an improved method is desired that may be used to determine thrust trajectory and on/off firing regions in a way that provides a fuel use reduction with minimum impact to the total orbit transfer time. Preferably, the method does not require the use of assumptions regarding the functional form of the thrust trajectory or the orbital locations where firing should occur. Also, a system is desired for implementing such a trajectory and firing regions on-board a spacecraft to perform a transfer from an intermediate orbit to a final mission orbit.

BRIEF SUMMARY OF THE INVENTION

The present invention relates generally to systems and methods for transferring a spacecraft from a first orbit to a second orbit. In accordance with one embodiment of the invention, the method comprises calculating thruster-off regions within an orbit transfer in which it is efficient to turn-off spacecraft thrusters, and in those thruster-off regions, turning off the spacecraft thrusters.

In accordance with another embodiment of the present invention, a method for efficiently transferring a spacecraft to a desired orbit comprises first computing a continuous-firing thrust trajectory to achieve an orbit transfer. The method further comprises computing thrust effectiveness values for time intervals over the continuous-firing thrust trajectory, comparing the thrust effectiveness values with a thrust effectiveness threshold value, and then computing an intermittent-firing thrust trajectory to achieve the orbit transfer. In accordance with this embodiment of the invention, the intermittent-firing thrust trajectory comprises thruster-on regions where the thrust effectiveness value is about or above the thrust effectiveness threshold value, and thruster-off regions where the thrust effectiveness value is below the thrust effectiveness threshold value.

In accordance with yet another embodiment of the present invention, the step of computing the intermittent-firing thrust trajectory may comprise the steps of: (1) determining one or more thruster-off regions for a first orbit revolution; (2) computing a first updated thrust trajectory for the entire orbit transfer using the thruster-off regions identified for the first orbit revolution in the calculation; (3) determining one or more thruster-off regions for a second orbit revolution using the first updated trajectory; (4) computing a second updated thrust trajectory for the entire orbit transfer using the thruster-off regions identified for the first and the second orbit revolutions in the calculation; and (5) continue computing thruster-off regions for each successive orbit revolution and further updated thrust trajectories until a final intermittent-firing thrust trajectory is determined for all orbits of the entire orbit transfer.

In accordance with one embodiment of the invention, the thruster-on regions, the thruster-off regions and the final intermittent-firing thrust trajectory can be determined prior to carrying out the orbit transfer.

In accordance with yet another embodiment of the present invention, the thrust effectiveness value is calculated according to the equation:

$$\Gamma(t) = 1 - \frac{\lambda_6 \dot{F}}{\lambda^T \dot{z}}$$

In accordance with yet anther embodiment of the present invention, prior to the step of comparing the thrust effectiveness value with a thrust effectiveness threshold value, the method further comprises determining the thrust effectiveness threshold value. For example, the thrust effectiveness threshold value may be calculated as a function of thruster shut-off time, fuel savings and increase in orbit transfer time.

In one embodiment, the thrust effectiveness threshold value is denoted $\Gamma_0$ and can be solved for by evaluating the integrals $$T_1(\Gamma_0) = \int_0^T \eta \Gamma \, dt$$
$$T_2(\Gamma_0) = \int_0^T \eta(1-\Gamma) \, dt$$
where, $\eta = 1$ if $\Gamma \leq \Gamma_0$
$\eta = 0$ if $\Gamma > \Gamma_0$ for values of $\Gamma_0$ between 0 and 1 with a reasonable resolution, wherein $T_1$ gives a relationship between the thrust effectiveness threshold value $\Gamma_0$ and a total increase in the orbit transfer time, and wherein $T_2$ gives a relationship between the thrust effectiveness threshold value $\Gamma_0$ and a reduction in firing time.

Yet another embodiment of the present invention comprises an orbit transfer system comprising thrusters and at least one controller adapted to implement the orbit transfer method as set forth herein. Still another embodiment of the present invention comprises a spacecraft that includes the orbit transfer systems and methods described herein.

A more complete understanding of the present invention can be derived by referring to the detailed description of preferred embodiments and claims when considered in connection with the figures.

BRIEF DESCRIPTION OF THE DRAWINGS

In the Figures, similar components and/or features may have the same reference label. Further, various components of the same type may be distinguished by following the reference label with a second label that distinguishes among the similar components. If only the first reference label is used in the specification, the description is applicable to any one of the similar components having the same first reference label irrespective of the second reference label.

DETAILED DESCRIPTION OF THE INVENTION

The present invention relates to a orbit transfer techniques, and more particularly to systems and methods for efficiently transferring a spacecraft from one orbit to another orbit.

Prior-art systems use a continuous-firing orbit transfer strategy, in which the ion thrusters are fired almost continuously over some period to provide a transfer from an initial to a final orbit. One drawback of firing ion thrusters continuously to carry-out an orbit transfer is that there may be some portions of the orbit where firing the thrusters is of only marginal benefit. Thus during those portions of the orbit, fuel is expended, but only a very small useful change in the orbit is achieved. To address this problem, the systems and methods of the present invention determine a spacecraft thrust vector trajectory and off-firing regions that eliminate these inefficient thrusting regions. As a result, the spacecraft orbit transfer requires less fuel, and thus, larger, more capable payloads can be put into space, increasing the revenue generating capability and utility of the spacecraft. Furthermore, the systems and methods of the present invention eliminate or mostly eliminate the inefficient firing regions, so that the increase in the orbit transfer time is minimized.

Figure 1:
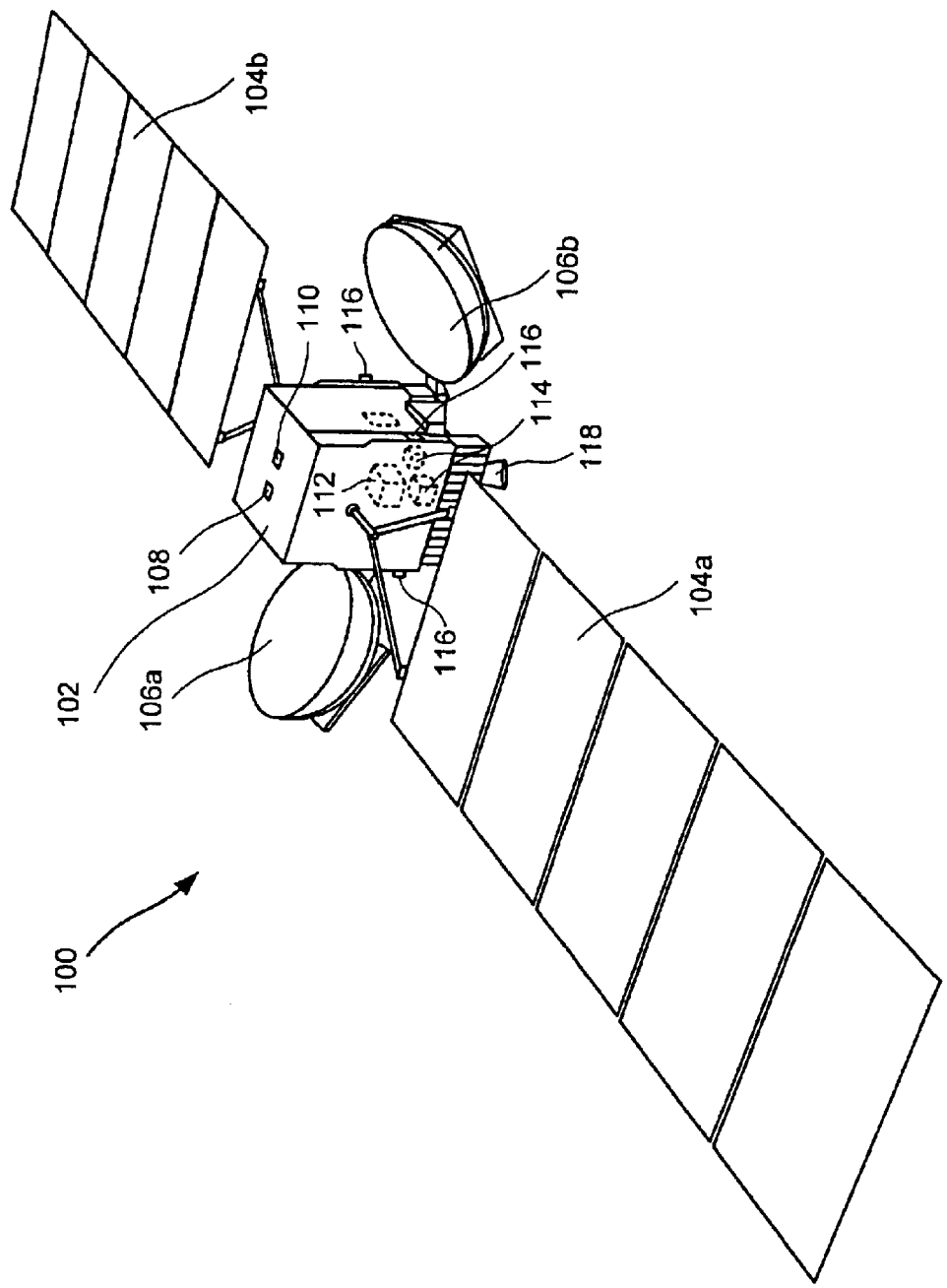
FIG. 1 is a drawing of one embodiment of a spacecraft that may include the systems and methods of the present invention.

Referring now to FIG. 1, one embodiment of a spacecraft 100 that may include the systems and methods for efficiently transferring a spacecraft from one orbit to another orbit in accordance with the present invention is shown. In the illustrated embodiment, spacecraft 100 includes a spacecraft center body 102, and solar panels 104a and 104b and communication antennas 106a and 106b connected to spacecraft center body 102. In addition, spacecraft 100 includes an attitude control system that may comprise attitude sensors, control torquers, and a processing system. For example, in the embodiment illustrated in FIG. 1, the attitude control system includes an earth sensor 108, a sun sensor 110, an inertial measurement unit (e.g., a gyro) 112, reaction wheels 114, attitude control thrusters 116, and orbit transfer thrusters 118.

As one skilled in the art will appreciate, the sensors (earth sensor 108, sun sensor 110 and IMU 112) are adapted to monitor the attitude of the spacecraft, and the control troquers (reaction wheels 114 and thrusters 116, 118) are adapted to provide attitude control and orbit-change capability. This may include transferring the spacecraft from its insertion orbit to its final orbit, and maintaining the spacecraft attitude while in its final orbit. Also, as one skilled in the art will appreciate, the attitude control processing system can be adapted to control the spacecraft as it transfers from its insertion orbit to its final orbit, as well as controlling the spacecraft attitude in its final orbit.

The location and position of thrusters 116 and 118 on spacecraft 100 are for illustration purposes only. One skilled in the art will appreciate that the thrusters can be located at a number of different locations on the spacecraft, which can be dictated by the spacecraft mission and orbit transfer requirements. Also, the spacecraft illustrated in FIG. 1 is but one example of a spacecraft that may embody the systems and methods of the present invention. Therefore, the present invention is not limited to the illustrated embodiment. One skilled in the art will appreciate that the systems and methods of the present invention can be used on any spacecraft configuration and for any spacecraft mission.

In accordance with the present invention, the term Gamma ($\Gamma$) will be used herein to refer to a thrusting effectiveness for a particular period during a given orbit transfer trajectory. As used herein, Gamma is the ratio of the change in the total orbit transfer time to the thruster shut off time, and may be computed for all time steps within the orbit transfer trajectory, as described below. At the portions of the orbit where Gamma is less than 1, it is beneficial to turn the thrusters off. In this case the total orbit transfer time increases, but because the shut-off time is greater than the increase in orbit transfer time, the total firing time and fuel usage are reduced. In fact, when the thruster is shut-off at a given time step, the reduction in firing time, which is proportional to the fuel savings, is just one minus the value of Gamma. Thus, in accordance with the present invention, the smaller the Gamma value, the greater the fuel benefit, and the lower the transfer time increase. In the optimal case where Gamma is equal to zero (Gamma cannot be less than zero), the transfer time does not increase at all when thruster firing time is removed.

The present invention provides for systems and methods for improving the efficiency of transferring a spacecraft from an initial orbit to a final orbit. In accordance with the present invention, an optimal orbit transfer trajectory is solved for starting from the prior-art continuous-firing solution. Next, the system determines when thrusters can and/or should be turned-off by calculating when Gamma is less than a specified threshold value. The threshold value is determined based on a number of factors, including desired fuel savings and maximum orbit transfer time available. A numerical iteration is performed to determine a minimum-time orbit transfer trajectory that achieves the final orbit with the Gamma constraint imposed.

Based on the results of the numerical optimization calculations, the spacecraft attitude is controlled to orient the thrusters' thrust vector in the direction of the specified thrust trajectory vector. The thrusters then are modulated so they fire within the specified firing regions of each orbit and do not fire in the specified off regions. To carry out an orbit transfer, the present invention can determine parameters for thruster firings to achieve the desired orbital change most efficiently. The thruster parameters can include when to turn thrusters on and off, and other parameters which are either the thrust vector direction (in an inertial or any other coordinate frame) or some other parameters which enable the spacecraft on-board software to compute the thrust vector direction at any time. A more detailed discussion of the systems and methods of the present invention is given below.

Figure 2:
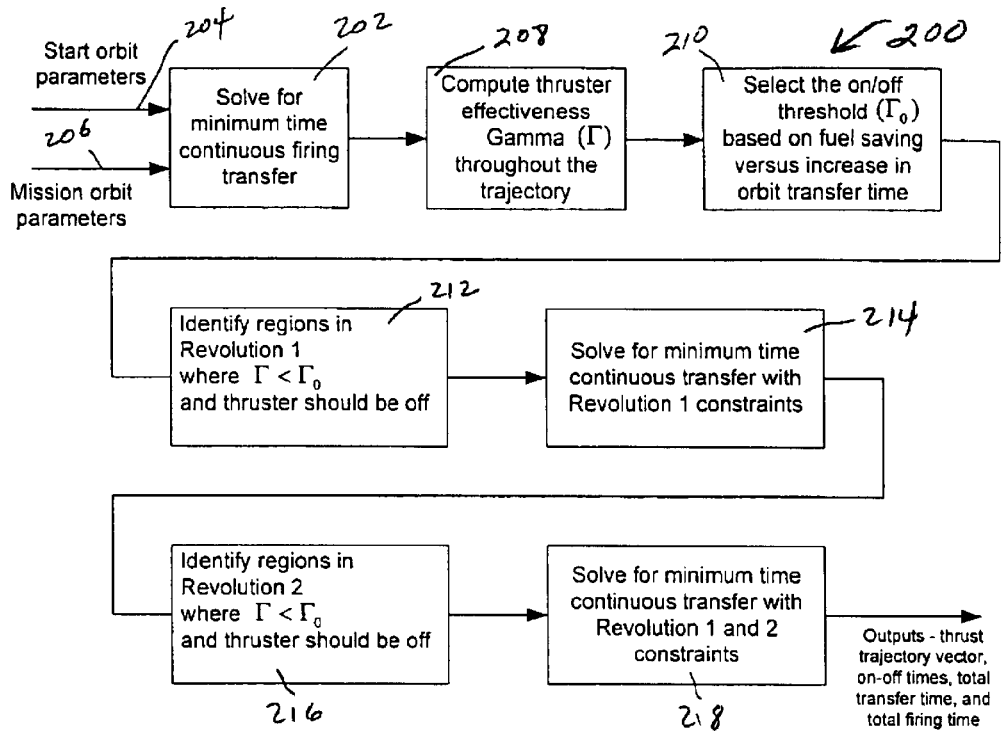
FIG. 2 is a flow chart illustrating one embodiment of a method according to the present invention.

Referring now to FIG. 2, flowchart 200 illustrates one embodiment of a method for carrying out orbit transfers in accordance with the present invention. In accordance with the illustrated embodiment, first a continuous-thruster-firing orbit transfer trajectory is calculated (block 202) using start orbit parameters 204 and mission orbit parameters 206. This "minimum-time" orbit transfer trajectory is first determined as if the change is to be carried out with continuous-firing thrusters. After the initial orbit transfer trajectory is determined, the thruster effectiveness value Gamma ($\Gamma$) is calculated for the initial continuous-firing orbit transfer trajectory (block 208).

In accordance with one embodiment of the present invention, the thruster effectiveness value Gamma can be computed as a function of time during the orbit transfer according to the following Equation (1):

$$\Gamma(t) = 1 - \frac{\lambda_6 \dot{F}}{\lambda^T \dot{z}} \quad (1)$$

where $\lambda$ is a 6×1 vector ($\lambda^T = [\lambda_1, \lambda_2, \lambda_3, \lambda_4, \lambda_5, \lambda_6]$), which is the co-state vector of the minimum-time orbit transfer solution. The co-state vector is a function of time and varies at each time step over the orbit transfer trajectory. The vector $\lambda$ is a Lagrange multiplier that multiplies the constraint equations in the formulation of the minimum-time orbit transfer problem. As is known to those of skill in the art, the constraint equations are the equations of motion of the orbit elements, which are also referred to as the orbit perturbation equations.

The orbit element state vector z is a 6×1 vector that contains (1) the orbit semi-major axis; (2) the y-component of eccentricity vector; (3) the x-component of eccentricity vector; (4) the y-component of inclination vector; (5) the x-component of inclination vector; and (6) the eccentric longitude (x and y are with respect to the equinoctial coordinate frame). The orbit state vector is as follows:

$$z = \begin{bmatrix} a \\ h \\ k \\ p \\ q \\ F \end{bmatrix} \quad (5)$$

where the orbit element perturbation equations for a, h, k, p, q, F are well known in the art. Each element of $\lambda$ multiplies a corresponding orbit element perturbation equation. In particular, $\lambda_6$ is the $6^{th}$ element of $\lambda$ and multiplies the perturbation equation for the eccentric longitude F, which is the $6^{th}$ element of the orbit element state vector z. In Equation (1), $\dot{z}$ is the 6×1 vector of orbit element time derivatives. Also, the quantity $\dot{F}$ in Equation (1) denotes the time rate of change of the eccentric longitude F and is also the $6^{th}$ element of $\dot{z}$.

After the thruster effectiveness value Gamma $\Gamma(t)$ is calculated for the initial thrust vector trajectory (block 208), an on/off threshold value $\Gamma_0$ is determined (block 210). A number of factors are used to generate the value for $\Gamma_0$ including thruster shut-off time, fuel savings, and the increase in orbit transfer time, as set forth below. Once the threshold value $\Gamma_0$ is determined, regions within revolution 1 of the orbit transfer are determined in which $\Gamma \leq \Gamma_0$ (block 212), which determines when the thrusters will be turned off. Finally, a minimum-time orbit transfer thrust trajectory vector is determined using the regions where the thrusters are tuned off (block 214).

In accordance with one embodiment of the present invention, to determine those regions in which the thrusters are to be turned off, the thruster effectiveness value Gamma $\Gamma(t)$ for the initial orbit transfer trajectory is evaluated to establish a relationship between the Gamma threshold value $\Gamma_0$, the thruster shut-off time, the fuel savings, and the increase in the total orbit transfer time. Once the Gamma threshold value $\Gamma_0$ is established, it is used in the final optimization step that solves for the minimum-time, on/off thruster-firing orbit transfer thrust trajectory vector (block 214).

To determine the effect of the Gamma threshold value $\Gamma_0$, the integrals of Equation (2) are evaluated for all time steps along the continuous-firing orbit transfer trajectory.

$$T_1(\Gamma_0) = \int_0^T \eta \Gamma \, dt \\ T_2(\Gamma_0) = \int_0^T \eta(1-\Gamma) \, dt \quad \text{where,} \quad \begin{matrix} \eta = 1 \text{ if } \Gamma \leq \Gamma_0 \\ \eta = 0 \text{ if } \Gamma > \Gamma_0 \end{matrix} \quad (2)$$

These two integrals can be evaluated for all possible values of the Gamma threshold $\Gamma_0$ varying from 0 to 1 with a reasonable resolution. The first integral $T_1$ gives the relationship between the Gamma threshold value and the total increase in the orbit transfer time. The second integral $T_2$ gives the relationship between the Gamma threshold value and the reduction in firing time. The fuel savings $M_f$ is proportional to the reduction in firing time, and in one embodiment, can be computed using Equation (3)

$$M_f = \frac{T_2 N F_t}{I_{sp}} \quad (3)$$

where N is the number of thrusters firing, $F_t$ is the thrust for a single thruster, and $I_{sp}$ is the mass specific impulse of the thruster. Using Equations (3) and (2) it is possible to determine the relationship between Gamma and the fuel savings. Additionally, since the relationship between Gamma and the increase in transfer time can be determined from Equation (2), the relationship between fuel savings and increase in transfer time can also be determined. Based on the relationship between fuel savings and the increase in orbit transfer time, and given the time available for orbit transfer, a Gamma threshold $\Gamma_0$ can be specified below which the thrusters are turned off. The minimum-time orbit transfer trajectory vector then is computed with the constraint that the thrusters are turned off wherever $\Gamma \leq \Gamma_0$ (block 214).

The minimum-time orbit transfer trajectory vector can be calculated using an iterative operation to determine the initial co-state vector $\lambda$, and the minimum transfer time from the initial orbit to the final orbit, while imposing the thruster on/off constraint of $\Gamma \leq \Gamma_0$. In accordance with one embodiment of the invention, the initial co-state vector $\lambda$ and the minimum transfer time can be obtained using a Newton-Raphson iteration approach, in which the iteration starting values for the co-state vector and the minimum transfer time can be the values which form the solution for the continuous-fire orbit transfer problem.

After the minimum-time orbit transfer thrust vector is determined for the initial revolution, the regions of the next orbit revolution (revolution 2) are identified where $\Gamma \leq \Gamma_0$ (block 216). The regions are determine in the manner as discussed above, but instead of starting the iteration from the continuous-firing orbit transfer solution, the iteration is started from the newly calculated solution with the gamma constraint applied to the first orbital revolution. By shutting off the thrusters in the region of revolution 2 where gamma is below threshold, as well as in the identified revolution 1 regions where gamma is below threshold, a new minimum-time orbit transfer trajectory is computed (block 218). This process is repeated for each subsequent orbit revolution until the optimal trajectory is obtained with the thruster off in all regions where $\Gamma \leq \Gamma_0$.

In accordance with an alternative embodiment of the invention, an alternative method is possible where the off-firing regions are first identified for all orbit revolutions of the orbit transfer. Next, the optimization problem is solved with thruster shut-off in all those regions. Once the solution is obtained, Gamma can be re-computed, and the thruster shut-off regions may be adjusted again according to the new values of Gamma. This way the solution may be iterated until there is insignificant change in the solution. Regardless of the method used to determine the optimal orbit transfer trajectory, the solution will be such that the orbit transfer time is minimized, and the thruster does not fire wherever Gamma (as determined from Equation (1)) is less than or equal to the specified threshold.

The present invention also includes a system for high efficiency spacecraft orbit transfer. In accordance with one embodiment of the invention, the orbit transfer system includes one or more processors for processing data provided from the ground, as well as data generated by on-board attitude sensors to carry out the method as described above. The processor(s) are operatively connected to the attitude sensor(s) and to command receivers and antennas to receive the data. To provide attitude control and effect an orbit change, the processor(s) are operatively connected to thrusters, thruster gimbals, solar array drives, and/or reaction wheel assemblies. As described above, an inertial thrust vector trajectory for the orbit transfer is generated. The system is adapted to orient the spacecraft so that the spacecraft thruster thrust vector remains aligned with the inertial thrust vector trajectory. The spacecraft thrusters are turned on and off during portions of each orbit until the spacecraft transfers to the desired orbit.

Figure 3:
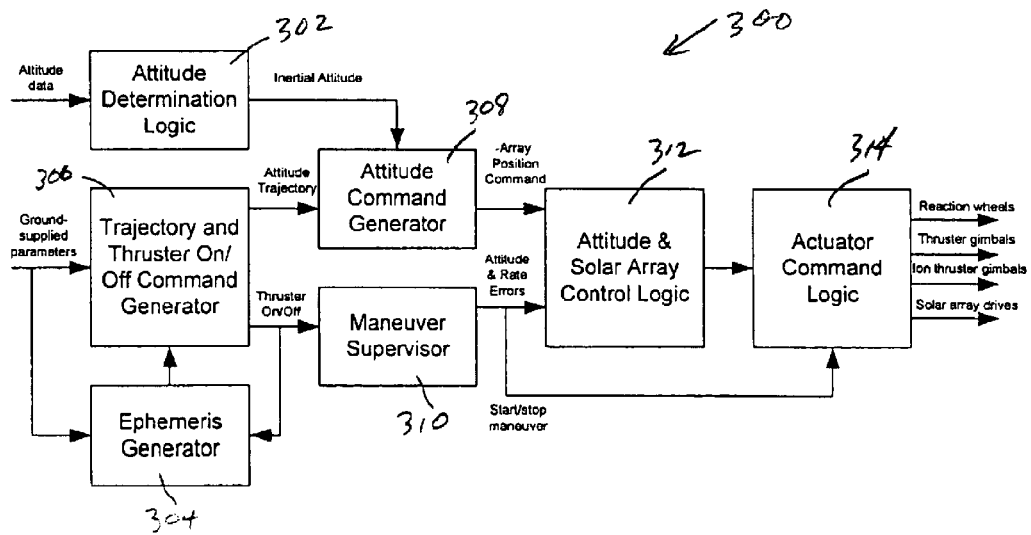
FIG. 3 is a block diagram illustrating one embodiment of an orbit transfer system according to the present invention.

Referring now to FIG. 3, one embodiment of an orbit transfer and attitude control system 300 in accordance with the present invention is shown. System 300 comprises attitude determination logic 302, an ephemeris generator 304, a trajectory and thruster on/off command generator 306, an attitude command generator 308, a maneuver supervisor 310, attitude and solar array control logic 312, and actuator command logic 314.

In accordance with one embodiment of the present invention, attitude determination logic 302 is adapted to maintain an estimate of the spacecraft inertial attitude by propagating three-axis gyro data from an Inertial Measurement Unit (IMU). The inertial attitude and gyro bias estimates can be updated utilizing attitude sensor data, including earth and sun sensor data or star tracker data.

Ephemeris generator 304 is adapted to determine the spacecraft ephemeris from ground supplied parameters, and other information. To generate the ephemeris, ephemeris generator 304 can be adapted to propagate the orbit perturbation equations using estimates of the applied thruster force and perturbation forces due to the sun and/or moon, and other higher order earth gravitation effects.

Trajectory and thruster on/off command generator 306 is adapted to generate the thrust vector trajectory using ground supplied parameters and information from the on-board ephemeris generator. Additionally, trajectory and thruster on/off command generator 306 can be adapted to generate thruster firing information that indicates when the thrusters should be turned on and when they should be turned off. Both the thrust vector trajectory and firing state may be generated based on parameters uploaded to the spacecraft. The ground supplied parameters can include parameters representative of the on/off thruster firing orbit transfer trajectory determined using the invented method, as well as other information.

In accordance with one embodiment of the present invention, ephemeris generator 304 is adapted to integrate both the orbit perturbation equations and the co-state differential equations to obtain both the ephemeris parameters and the co-states at a given time. Trajectory and thruster on/off command generator 306 then can use the co-states to solve for the thrust vector direction. The orbit perturbation equations, the co-state equations, and the equation relating the co-states to the thrust vector direction are the same equations used to generate a continuous-firing minimum-time orbit transfer solution, and hence are well known to those skilled in the art.

Trajectory and thruster on/off command generator 306 also can generate thruster activation information based on ground-supplied parameters and the spacecraft ephemeris. As discussed above, thruster on/off commands can be determined by using the calculated Gamma value, which is based on the ephemeris and co-state information according to Equation 1. When Gamma is above the specified Gamma threshold value, the thrusters are fired, and when Gamma is below the specified Gamma threshold value, the thrusters are turned off.

Trajectory generator 306 calculates an attitude trajectory using the generated thrust vector trajectory. This attitude trajectory can be represented as a coordinate transformation from an inertial to a spacecraft body coordinate frame. When the spacecraft tracks this attitude trajectory, the thruster thrust vector remains aligned with the thrust trajectory vector. In one embodiment of the invention, the thrust vector may be close to the yaw(x)/roll(y) plane of the spacecraft body, for example, close to the roll axis of the spacecraft. Furthermore, the attitude trajectory may be determined so that the spacecraft is controlled to an orientation about the thruster thrust vector. In this orientation, the sun vector may lie almost in the spacecraft yaw/roll plane. Since the solar array rotates about the pitch(z) axis (the normal vectors to the solar array panel surfaces are in the yaw/roll plane), the solar arrays may be oriented to point at the sun while the orbit transfer is performed. The solar arrays then can provide adequate power to the spacecraft to operate the ion thrusters and other on-board spacecraft equipment.

The thruster firing information from trajectory and thruster on/off command generator 306 is supplied to maneuver supervisor 310, which controls the initiation and completion of orbit transfer thruster firing segments. Maneuver supervisor 310 can switch operating modes, switch actuators, and/or determine which attitude the spacecraft tracks during periods when the thrusters are not firing.

The spacecraft attitude command generator 308 receives inertial attitude information from attitude determination logic 302 and attitude trajectory information from trajectory generator 306 and generates attitude error correction information. The attitude error information is computed based on the spacecraft inertial attitude, the thrust vector trajectory, and possibly the Sun vector, and is used to null the attitude errors so that the thruster thrust vector remains aligned with the thrust vector trajectory, and the sun vector remains oriented in the spacecraft yaw/roll plane (perpendicular to the solar array rotation axis).

The attitude error information from attitude command generator 308 is input to attitude and solar array control logic 312, which generates solar array position commands necessary to point the solar array at the sun. While the thrusters are firing, attitude and solar array control logic 312 can partition the torque demand between the thruster gimbals and the reaction wheel assemblies (RWAs). When the thrusters are not firing, the attitude and solar array control logic 312 applies the control torque demand entirely to the RWAs, and/or partitions the control torque demand between the RWAs and hydrazine control thrusters (REAs).

In response to the commands generated by attitude and solar array control logic 312, actuator command logic 314 sends commands to the RWAs, the thruster gimbals, the ion thruster gimbals, and/or the solar array drives, which in turn controls the attitude of the spacecraft. Actuator command logic 314 also may control the RWAs, thruster gimbals, ion thruster gimbals and/or solar array drives using information and commands from maneuver supervisor 310.

Figure 4:
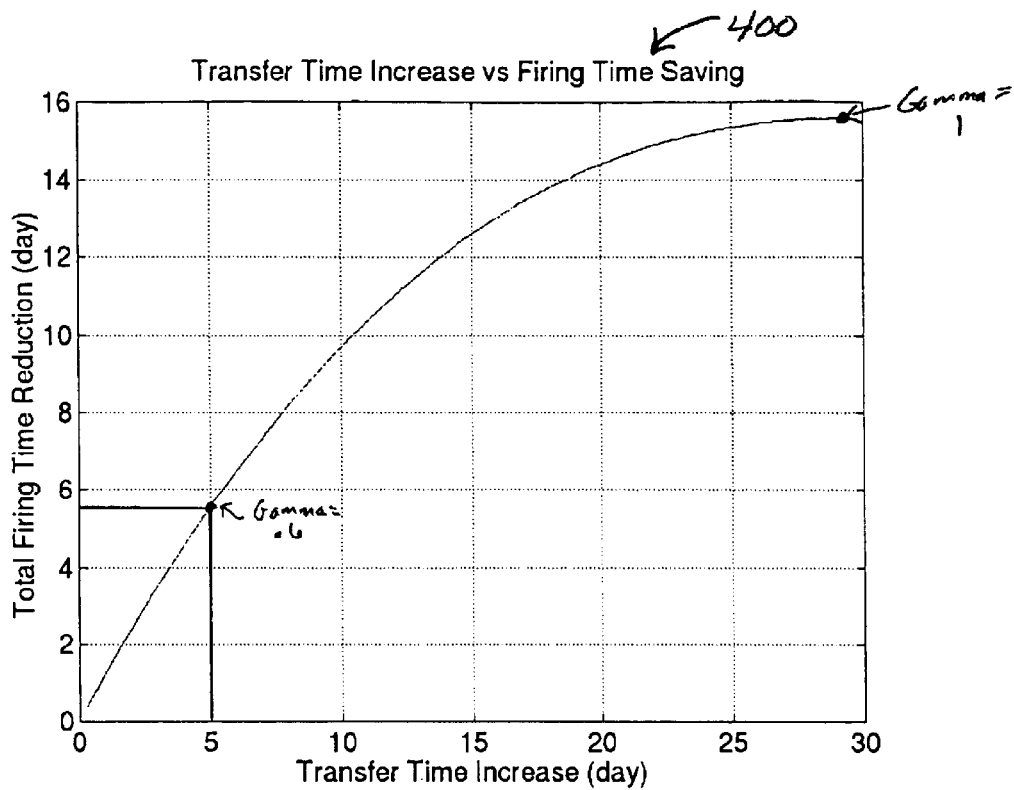
FIG. 4 is graph illustrating the relationship between fuel savings and the increase in transfer time for one embodiment of a method according to the present invention.

Referring now to FIGS. 4–6, an example of the benefits of the systems and methods of the present invention will be described. This particular example assumes an orbit transfer using two Hall Current Thrusters (HCTs) fired at about 9 kW. The starting orbit has perigee and apogee altitudes of about 13,098 km and about 35,786 km, respectively, and 7 degrees inclination. The initial spacecraft mass is about 4500 kg, and the desired final orbit is a circular Geosynchronous orbit with zero inclination. FIG. 4 is a graph 400 illustrating the plot between the firing time reduction, which is proportional to the fuel savings (y-axis), and the increase in total transfer time (x-axis). From FIG. 4, as an example, it can be noted that by allowing an additional 5 days to transfer the spacecraft to its final orbit, about 5.5 days of firing time can be removed. This point on the curve shown in FIG. 4 corresponds to a gamma threshold value of 0.6, and during the orbit transfer the thrusters are shut off wherever the value of Gamma is less than or equal to 0.6. The 5.5 days of reduced thruster firing corresponds to a fuel savings of roughly 15.7 kg, assuming a total HCT thrust of 0.13 lbs (with two HCTs firing) and an HCT specific impulse of 1771 seconds.

Figure 5A:
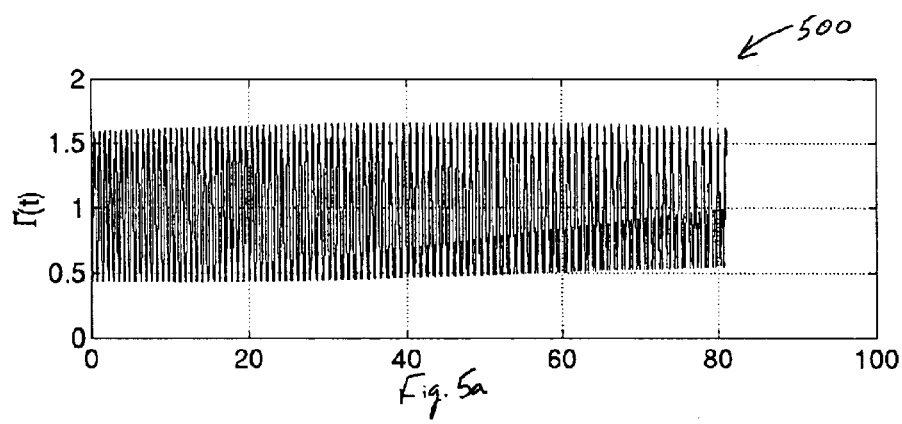
FIGS. 5a and 5b are graphs illustrating the relationship between Gamma and time for an orbit transfer conducted with thrusters firing intermittently according to one embodiment of a method according to the present invention.
Figure 5B:
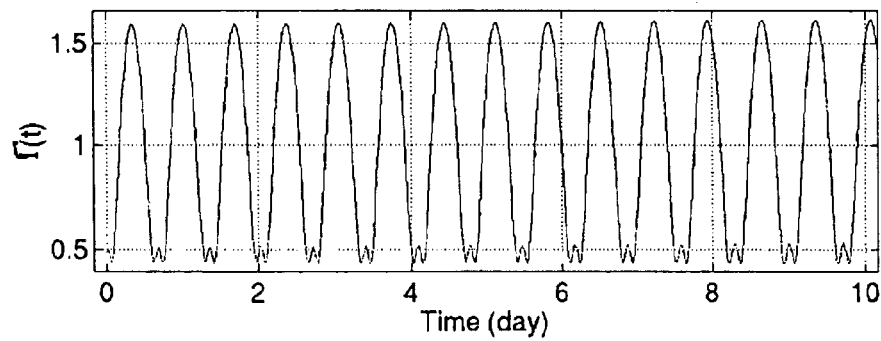

FIG. 5a shows a graph 500 of Gamma versus time during an entire orbit transfer using the prior-art continuous-firing approach. FIG. 5b is an expanded version of FIG. 5a for the first 10 days of the orbit transfer. The transfer time using the continuous-firing approach is 81.1 days, which is the minimum possible time for this orbit transfer using two HCTs and the HCT, spacecraft, and orbit parameters given previously.

As per the approach shown in FIG. 2, the shut-off region in the first revolution is identified based on Gamma less than 0.6 from FIG. 5b. Next, the minimum time continuous solution with the first revolution off constraint is obtained. A similar Gamma versus time relation plot for this new solution is obtained. Next, the shut-off region in the second revolution is identified where Gamma is less than 0.6 in the new plot. This process is then repeated for 37 revolutions. The total transfer time increase obtained is 4.4 days and the firing time reduction is 3.9 days, which corresponds to a fuel reduction of 11.1 kg.

In conclusion, the present invention provides novel systems and methods for efficiently transferring a spacecraft from an initial orbit to a final orbit. While detailed descriptions of one or more embodiments of the invention have been given above, various alternatives, modifications, and equivalents will be apparent to those skilled in the art without varying from the spirit of the invention. For example, while various embodiments for solving for the orbit transfer thrust vector trajectory and thruster on/off times are given herein, one skilled in the art will appreciate that other methods may be devised to solve for these values. Therefore, the above description should not be taken as limiting the scope of the invention, which is defined claims.

What is claimed is:

1. A method for efficiently transferring a spacecraft to a desired orbit, the method comprising:
   computing a continuous-firing thrust trajectory to achieve an orbit transfer;
   computing thrust effectiveness values for time intervals over the continuous-firing thrust trajectory;
   comparing the thrust effectiveness values with a thrust effectiveness threshold value; and
   computing an intermittent-firing thrust trajectory to achieve the orbit transfer, the intermittent-firing thrust trajectory comprising thruster-on regions where the thrust effectiveness value is about or above the thrust effectiveness threshold value, and thruster-off regions where the thrust effectiveness value is below the thrust effectiveness threshold value.

2. The method as recited in claim 1, wherein computing the intermittent-firing thrust trajectory comprises:
   determining one or more thruster-off regions for a first orbit revolution;
   computing a first updated thrust trajectory for the entire orbit transfer using the thruster-off regions identified for the first orbit revolution in the calculation;
   determining one or more thruster-off regions for a second orbit revolution using the first updated trajectory;
   computing a second updated thrust trajectory for the entire orbit transfer using the thruster-off regions identified for the first and the second orbit revolutions in the calculation; and
   continue computing thruster-off regions for each successive orbit revolution and further updated thrust trajectories until a final intermittent-firing thrust trajectory is determined for all orbits of the entire orbit transfer.

3. The method as recited in claim 2, wherein the thruster-on regions, the thruster-off regions and the final intermittent-firing thrust trajectory are determined prior to carrying out the orbit transfer.

4. The method as recited in claim 1, wherein the thrust effectiveness value is calculated according to the equation:

$$\Gamma(t) = 1 - \frac{\lambda_6 F}{\lambda^T \xi}.$$

5. The method as recited in claim 1, wherein prior to comparing the thrust effectiveness value with a thrust effectiveness threshold value, the method further comprises determining the thrust effectiveness threshold value.

6. The method as recited in claim 5, wherein the thrust effectiveness threshold value is a function of thruster shut-off time, fuel savings and increase in orbit transfer time.

7. The method as recited in claim 5, wherein the thrust effectiveness threshold value is denoted $\Gamma_0$ and can be solved for by evaluating the integrals $$T_1(\Gamma_0) = \int_0^T \eta \Gamma \, dt$$
$$T_2(\Gamma_0) = \int_0^T \eta(1 - \Gamma) \, dt$$
where, $\eta = 1$ if $\Gamma \leq \Gamma_0$, $\eta = 0$ if $\Gamma > \Gamma_0$ for values of $\Gamma_0$ between 0 and 1 with a reasonable resolution, wherein $T_1$ gives a relationship between the thrust effectiveness threshold value $\Gamma_0$ and a total increase in the orbit transfer time, and wherein $T_2$ gives a relationship between the thrust effectiveness threshold value $\Gamma_0$ and a reduction in firing time.

8. The method as recited in claim 1, wherein an amount of fuel required to perform the orbit transfer is lower than the amount of fuel required to perform a time-optimal continuous-firing orbit transfer.

9. The method as recited in claim 1, wherein an increase in transfer time compared to a time-optimal continuous firing orbit transfer is minimized.

10. The method as recited in claim 1, wherein the thrusters are not fired when the orbit change is insensitive to thrusting.

11. The method as recited in claim 1, wherein the thrusters are not fired when a required rate of change of thrust trajectory direction is too large for the spacecraft to follow.

12. The method as recited in claim 1, wherein the change in orbit comprises a transfer from a launch vehicle injection orbit to a final mission orbit.

13. The method as recited in claim 1, wherein the thrusters are not fired when continuously firing the thrusters will not reduce the velocity change required to complete the orbit transfer by at least a threshold amount.

14. A spacecraft orbit transfer system adapted to transfer the spacecraft from a first orbit to a second orbit, the system comprising:

spacecraft thrusters; and at least one controller adapted to control the spacecraft orbit transfer;

the spacecraft orbit transfer system being adapted to:
- compute a continuous-firing thrust trajectory to achieve an entire orbit transfer;
- compute thrust effectiveness values for time intervals over the continuous-firing thrust trajectory;
- compare the thrust effectiveness values with a thrust effectiveness threshold value; and
- compute an intermittent-firing thrust trajectory to achieve the orbit transfer, the intermittent-firing thrust trajectory comprising thruster-on regions where the thrust effectiveness value is at about or above the thrust effectiveness threshold value and thruster-off regions where the thrust effectiveness value is below the thrust effectiveness threshold value, wherein the spacecraft thrusters are turned-on during the thruster-on regions, and the spacecraft thrusters are turned-off during the thruster-off regions.

15. The system as recited in claim 14, wherein the at least one controller is selected from the group consisting of at least one controller on the spacecraft, at least one controller on the earth, and a combination of at least one controller on the spacecraft and at least one controller on the earth.

16. The system as recited in claim 14, wherein the spacecraft orbit transfer system computes the intermittent-firing thrust trajectory by:
- determining one or more thruster-off regions for a first orbit revolution;
- computing a first updated thrust trajectory for the entire orbit transfer using the thruster-off regions identified for the first orbit revolution in the calculation;
- determining one or more thruster-off regions for a second orbit revolution using the first updated trajectory;
- computing a second updated thrust trajectory for the entire orbit transfer using the thruster-off regions identified for the first and the second orbit revolutions in the calculation; and
- continue computing thruster-off regions for each successive orbit revolution and further updated thrust trajectories until a final intermittent-firing thrust trajectory is determined for all orbits of the entire orbit transfer.

17. The system as recited in claim 16, wherein the spacecraft orbit transfer system determines the thruster-on regions, the thruster-off regions and the final intermittent-firing thrust trajectory prior to carrying out the orbit transfer.

18. The system as recited in claim 14, wherein the thrust effectiveness value is calculated according to the equation:

$$\Gamma(t) = 1 - \frac{\lambda_6 \dot{F}}{\lambda^T \dot{z}}.$$

19. The system as recited in claim 14, wherein the spacecraft orbit transfer system determines the thrust effectiveness threshold value prior to comparing the thrust effectiveness value with a thrust effectiveness threshold value.

20. The system as recited in claim 19, wherein the thrust effectiveness threshold value is a function of thruster shut-off time, fuel savings and increase in orbit transfer time.

21. The system as recited in claim 19, wherein the thrust effectiveness threshold value is denoted $\Gamma_0$ and can be solved for by evaluating the integrals $$T_1(\Gamma_0) = \int_0^T \eta \Gamma \, dt$$
$$T_2(\Gamma_0) = \int_0^T \eta(1-\Gamma) \, dt$$

where, $\eta = 1$ if $\Gamma \leq \Gamma_0$; $\eta = 0$ if $\Gamma > \Gamma_0$ for values of $\Gamma_0$ between 0 and 1 with a reasonable resolution, wherein $T_1$ gives a relationship between the thrust effectiveness threshold value $\Gamma_0$ and a total increase in the orbit transfer time, and wherein $T_2$ gives a relationship between the thrust effectiveness threshold value $\Gamma_0$ and a reduction in firing time.

22. The system as recited in claim 14, wherein an amount of fuel required to perform the orbit transfer is lower than the amount of fuel required to perform a time-optimal continuous-firing orbit transfer.

23. The system as recited in claim 14, wherein an increase in transfer time compared to a time-optimal continuous firing orbit transfer is minimized.

24. The system as recited in claim 14, wherein the thrusters are not fired when the spacecraft orbit change is insensitive to thrusting.

25. The system as recited in claim 14, wherein the thrusters are not fired when a required rate of change of thrust trajectory direction is too large for the spacecraft to follow.

26. The system as recited in claim 14, wherein the first orbit comprises a launch vehicle injection orbit and the second orbit comprises a final mission orbit.

27. The system as recited in claim 14, wherein the thrusters are not fired when continuously firing the thrusters will not reduce the velocity change required to complete the orbit transfer by at least a threshold amount.

28. A spacecraft adapted to transfer from a first orbit to a second orbit, comprising:

spacecraft thrusters; and an orbit transfer system adapted to transfer the spacecraft from a first orbit to a second orbit, the orbit transfer system comprising at least one controller adapted to control the spacecraft orbit transfer, the spacecraft orbit transfer system being adapted to:
- compute a continuous-firing thrust trajectory to achieve an entire orbit transfer;
- compute thrust effectiveness values for time intervals over the continuous-firing thrust trajectory;
- compare the thrust effectiveness values with a thrust effectiveness threshold value; and
- compute an intermittent-firing thrust trajectory to achieve the orbit transfer, the intermittent-firing thrust trajectory comprising thruster-on regions where the thrust effectiveness value is at about or above the thrust effectiveness threshold value and thruster-off regions where the thrust effectiveness value is below the thrust effectiveness threshold value, wherein the spacecraft thrusters are turned-on during the thruster-on regions, and the spacecraft thrusters are turned-off during the thruster-off regions.

29. The spacecraft as recited in claim 28, wherein the at least one controller is selected from the group consisting of at least one controller on the spacecraft, at least one controller on the earth, and a combination of at least one controller on the spacecraft and at least one controller on the earth.

30. The spacecraft as recited in claim 28, wherein the orbit transfer system computes the intermittent-firing thrust trajectory by:

determining one or more thruster-off regions for a first orbit revolution;

computing a first updated thrust trajectory for the entire orbit transfer using the thruster-off regions identified for the first orbit revolution in the calculation;

determining one or more thruster-off regions for a second orbit revolution using the first updated trajectory;

computing a second updated thrust trajectory for the entire orbit transfer using the thruster-off regions identified for the first and the second orbit revolutions in the calculation; and continue computing thruster-off regions for each successive orbit revolution and further updated thrust trajectories until a final intermittent-firing thrust trajectory is determined for all orbits of the entire orbit transfer.

31. A method for transferring a spacecraft from a first orbit to a second orbit, comprising:

calculating thruster-off regions within the orbit transfer in which it is efficient to turnoff spacecraft thrusters, based on a comparison for each region of a computed thrust effectiveness value to a thrust effectiveness threshold value; and turning off the spacecraft thrusters in the thruster-off regions during the orbit transfer.

* * * * *